United States Patent
Wang et al.

(10) Patent No.: US 8,451,556 B1
(45) Date of Patent: May 28, 2013

(54) METHOD AND SYSTEM FOR PROVIDING A MOLDED CAPPING LAYER FOR AN ENERGY ASSISTED MAGNETIC RECORDING HEAD

(75) Inventors: Lei Wang, Fremont, CA (US); Shing Lee, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 741 days.

(21) Appl. No.: 12/646,896

(22) Filed: Dec. 23, 2009

(51) Int. Cl.
*G11B 5/02* (2006.01)
*G11B 5/127* (2006.01)
*G11B 11/00* (2006.01)

(52) U.S. Cl.
USPC ............................ 360/59; 360/110; 369/13.33

(58) Field of Classification Search
None
See application file for complete search history.

(56) References Cited

U.S. PATENT DOCUMENTS

| | | | |
|---|---|---|---|
| 6,455,398 B1 | 9/2002 | Fonstad, Jr. et al. | |
| 7,203,387 B2 | 4/2007 | Doan | |
| 8,024,748 B1 | 9/2011 | Moravec et al. | |
| 8,134,794 B1 | 3/2012 | Wang | |
| 2008/0049563 A1* | 2/2008 | Konno et al. | 369/13.24 |
| 2010/0328807 A1* | 12/2010 | Snyder et al. | 360/59 |

* cited by examiner

*Primary Examiner* — Regina N Holder

(57) ABSTRACT

A method and system for providing energy assisted magnetic recording (EAMR) heads are described. The heads include sliders and lasers coupled with the sliders. The method and system include molding an enclosure layer. The enclosure layer has a laser-facing surface and a top surface opposing the laser-facing surface. The laser-facing surface has a cavity including a concave section. The method and system further includes providing a reflective layer on the cavity. A portion of the reflective layer resides on the concave section, collimates light from the laser, and provides the collimated light to the EAMR transducer. The method and system further includes aligning the concave section of the cavity with a light emitting portion of the laser. The enclosure layer is also bonded to the slider.

24 Claims, 12 Drawing Sheets

Side View
FIG. 4

FIG. 5

Top View

Side View
FIG. 6

Top View

Side View
FIG. 11

METHOD AND SYSTEM FOR PROVIDING A MOLDED CAPPING LAYER FOR AN ENERGY ASSISTED MAGNETIC RECORDING HEAD

BACKGROUND

Figure 1:
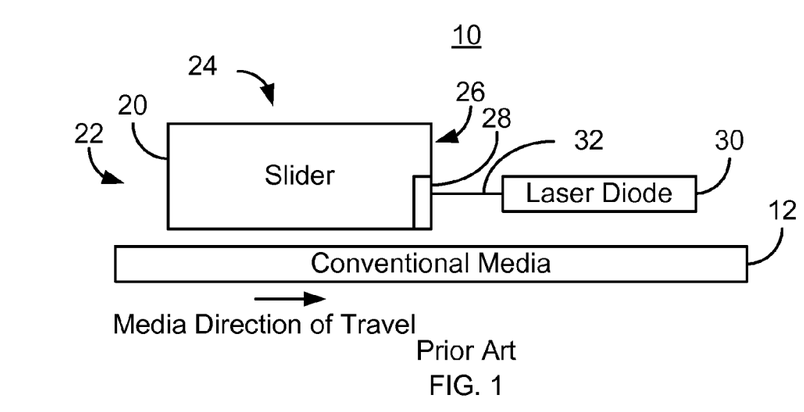
FIG. 1 is a diagram depicting a portion of a conventional energy assisted magnetic recording disk drive.

FIG. 1 depicts a side view of portion of a conventional energy assisted magnetic recording (EAMR) disk drive 10. The conventional EAMR disk drive 10 includes a recording media 12, a conventional slider 20, and a conventional laser diode 30 that are typically attached to a suspension (not shown). The conventional slider 20 has a leading edge 22, a trailing edge 26, and a back side 24. Other components that may be part of the conventional EAMR disk drive 10 are not shown. The conventional slider 20 is typically attached to the suspension at its back side 24. A conventional EAMR transducer 22 is coupled with the slider 20.

The laser diode 30 is coupled in proximity to the EAMR transducer 22 on the trailing edge 26 of the slider 20. Light from the conventional laser diode 30 is provided substantially along the optic axis of the conventional laser diode 30 to the trailing edge 26 of the slider 20. Light may be provided via an optical component 32. Although shown as a line, the optical component may be a fiber, a mirror, a lens, another optical component, or some combination thereof. Light from the laser diode 30 is provided to a grating (not shown) of conventional EAMR transducer 22. The light from the laser diode 30 coupled into the grating is then provided to a waveguide (not shown). The waveguide directs the light toward the conventional media 12, heating a small region of the conventional media 12. The conventional EAMR transducer 22 magnetically writes to the conventional media 12 in the region the conventional media 12 is heated.

Figure 2:
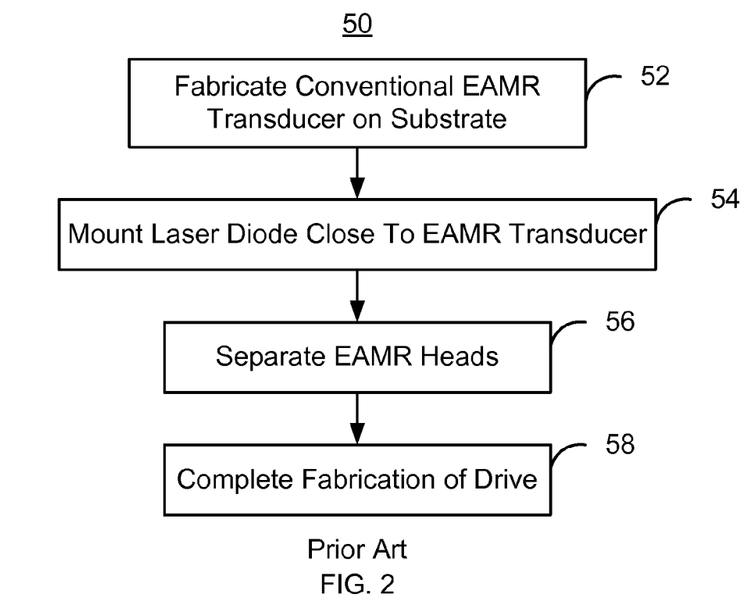
FIG. 2 is a flow chart depicting a conventional method for fabricating a conventional EAMR disk drive.

FIG. 2 depicts a conventional method 50 for fabricating a portion of the conventional EAMR disk drive 10. For simplicity, only a portion of the method 50 is described. The EA conventional MR transducer 28 is fabricated on the front side of a conventional substrate, such as an AlTiC substrate, via step 52. Typically, a reader for the conventional disk drive 10 has already been fabricated. Thus, the conventional EAMR transducer 28 is built on other structures. Typically, multiple transducers are fabricated in parallel on the same substrate.

Once fabrication of the conventional EAMR transducer 28 is completed, the laser diode 30 may be mounted in proximity to the conventional EAMR transducer 28, via step 54. More specifically, the laser diode 30 is mounted in proximity to the trailing surface 26 of the slider 20. Further, the optical component 32 may also be aligned and affixed in place as part of step 54. The EAMR heads may then be separated, via step 56. For example, the substrate holding the EAMR transducers 28 may be diced or otherwise cut into individual sliders 20. The front side of the substrate, on which the EAMR transducer 28 is fabricated, becomes the trailing edge 26 of the slider 20. In other embodiments, the EAMR heads are separated prior to the laser diode 30 being mounted. However, in both cases, the laser diode is mounted in proximity to the EAMR transducer 26. The fabrication of the conventional drive 10 may then be completed. For example, the conventional EAMR head including the conventional slider 20 and conventional EAMR transducer 28 may be mounted on a flexure and then in a disk drive.

Although the conventional EAMR disk drive 10 and method 50 may function, improvements are desired. More specifically, aligning the laser 30 and optical component 32 to the desired position with respect to the conventional transducer 28 is time consuming and prone to error. Further, the throughput and yield of a manufacturing for fabricating the conventional EAMR disk drive 10 may be adversely affected.

Accordingly, what is needed are improved methods and systems for fabricating EAMR disk drives.

BRIEF SUMMARY OF THE INVENTION

A method and system for providing energy assisted magnetic recording (EAMR) heads are described. The heads include sliders and lasers coupled with the sliders. The method and system include molding an enclosure layer. The enclosure layer has a laser-facing surface and a top surface opposing the laser-facing surface. The laser-facing surface has a cavity including a concave section. The method and system further includes providing a reflective layer on the cavity. A portion of the reflective layer resides on the concave section, collimates light from the laser, and provides the collimated light to the EAMR transducer. The method and system further includes aligning the concave section of the cavity with a light emitting portion of the laser. The enclosure layer is also bonded to the slider.

DETAILED DESCRIPTION OF EMBODIMENTS OF THE INVENTION

Figure 3:
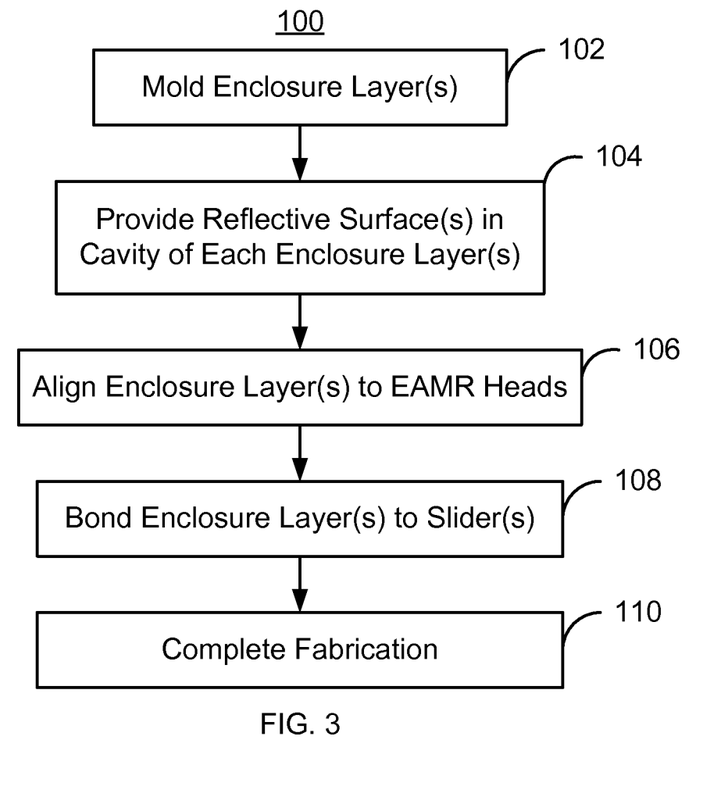
FIG. 3 is a flow chart depicting an exemplary embodiment of a method for fabricating an EAMR head.

FIG. 3 is a flow chart depicting an exemplary embodiment of a method 100 for fabricating EAMR heads. Although certain steps are shown, some steps may be omitted, interleaved, performed in another order, and/or combined. The EAMR heads being fabricated may be part of merged heads, each of which includes an EAMR write transducer, a read transducer (not shown) and resides on a slider. The EAMR transducer includes optical components, such as gratings, waveguides, and near-field transducers (NFTs), as well as magnetic components such as poles, shields, and coils. Further, each EAMR head includes a slider having a leading edge and a trailing edge. Although termed "edges", the leading edge corresponds to a leading surface, while the trailing edge corresponds to a trailing surface. Each EAMR head has at least one EAMR transducer fabricated on the substrate, which corresponds to the slider after the substrate is diced to provide separate EAMR heads. The EAMR head also has at least one laser corresponding to the EAMR transducers. The laser is bonded to the substrate at a desired location. In some embodiments, the laser is an edge emitting laser. The transducer is fabricated on the trailing edge of the slider. Similarly, the laser may be bonded to the trailing edge of the slider. This trailing edge corresponds to the front face of the substrate, which becomes the slider once the EAMR heads are separated.

An enclosure layer is molded for each EAMR head, via step 102. In some embodiments, the enclosure layer is a layer moldable layer that resides on a carrier substrate. For example, the moldable layer may include silicon, glass, and/or a polymer such as photoresist or a spin-on glass. The carrier substrate may be a silicon or glass wafer or an AlTiC substrate. A mold master having an image corresponding to the enclosure layer for multiple EAMR heads may be pressed into the moldable layer. The mold master may be a diamond-turned or other highly accurate, smooth, mirror image of the enclosure layers for the EAMR heads. The moldable layer is then heated or otherwise cured. As a result, multiple adjoining enclosure layers may be formed. Each enclosure layer has a laser-facing surface and a top surface opposing the laser-facing surface. The top surface faces the carrier wafer during fabrication. The laser-facing surface includes a cavity therein. The cavity is configured to fit the laser of the EAMR head. The cavity also includes a concave section. In some embodiments, the concave section is parabolic in shape. The enclosure layer may also include via holes, or through-holes, through which electrical connection can be made. Such electrical connection may be for the EAMR transducer, the laser, and/or other components of the EAMR head.

A mirror for collimating the laser is desirable as high power density laser beam can damage materials such as polymers and doped glasses due to heating, and laser induced color centers. A reflective layer(s) are provided on the cavity, via step 104. Step 104 includes depositing the reflective layer(s), such as a metal, within the cavity. The materials used for the reflective layer may include, for example, layers of Cu and Au. The reflective layer(s) reside on at least the concave section of the cavity. Thus, a concave mirror, such as a parabolic mirror, may be formed. However, the reflective layer(s) may cover the inside surface of the cavity. Thus, the reflective layer is to collimate electromagnetic radiation (light) from the laser and provide the light to the EAMR transducer. In addition, the reflective layer may assist in spreading and dissipating heat generated by the laser.

The enclosure layer is aligned to the corresponding EAMR head, via step 106. Step 106 includes aligning and placing the enclosure layers at the desired position with respect to the lasers of the EAMR heads. More specifically, the concave section of each of the cavities is aligned with respect to the light-emitting portion of the laser. Thus the concave mirror that collimates the light is aligned as desired to the portion of the laser that emits light. Step 106 may make use or passive alignment. For example, the cavity may be aligned with respect to alignment marks on the EAMR heads. In general, the alignment marks used are desired to be close to the concave mirror so that alignment of the concave mirror is not adversely affected by issues such as thermal expansion. In some embodiments, active alignment might be used. Active alignment utilizes the signal from the laser(s) to determine whether the enclosure layer(s) are properly aligned. In some embodiments, a combination of active and passive alignment may be used.

The enclosure layer is bonded to the slider for example using wafer bonding, via step 108. Thus, the laser is enclosed in the cavity. Fabrication of the EAMR transducers is then completed, via step 110. The carrier substrate may be removed from the enclosure layer in step 110. For example, the carrier substrate may be ground, chemically or thermally released, or released using ultraviolet light. For example, vias and contact pads may be plated. The substrate may also be substrate is separated into the EAMR heads, via step 110. Step 110 may include dicing the substrate such that the components fabricated in step 102 through 108 remain with the corresponding EAMR head.

Figure 4:
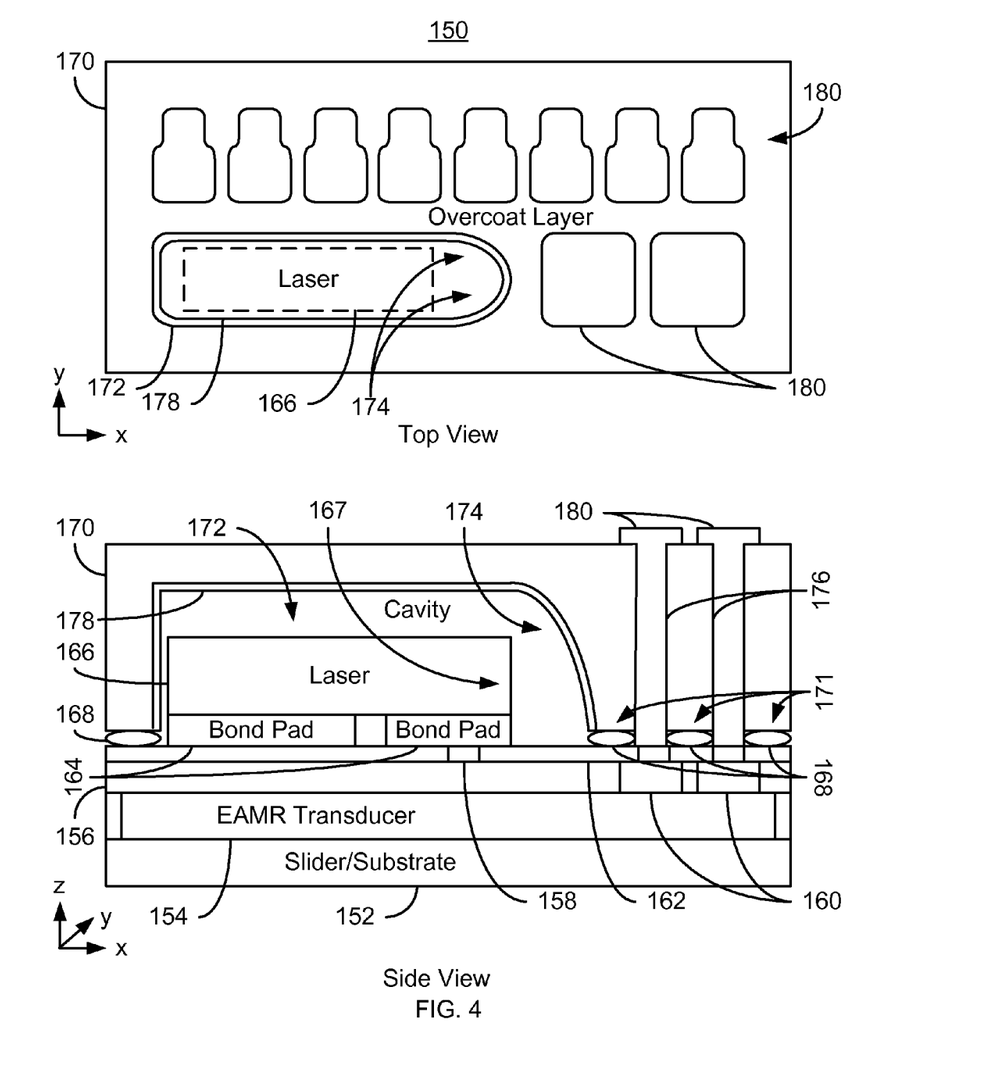
FIG. 4 is a diagram depicting an exemplary embodiment of an EAMR head.

FIG. 4 is a diagram depicting an exemplary embodiment of an EAMR head 150 fabricated using the method 100. FIG. 4 depicts side and top views of the EAMR head 150. For clarity, FIG. 4 is not to scale. The EAMR head 150 includes a slider 152 which is part of the substrate. One or more EAMR transducers reside 154 on the slider/substrate 152. In the embodiment shown in FIG. 4, a single EAMR transducer 154 is shown. In addition, the EAMR head 150 may include a read transducer (not shown) and other components. Optional intermediate layers 156 and 162 are also shown. Layers 156 and 162 provide contacts 158 and 160 to the laser 166 and the EAMR transducer as well as insulating the laser 166 from electrical contact with the EAMR transducer 154 and its contacts 160. Laser 166 is bonded via the bond pads 164. Bond pads 164 may provide electrical and mechanical connection to the laser 166. In addition, the bond pads 164 may serve as a heat sink and/or heat conduit. In some embodiments, the laser 166 is an edge-emitting laser. Thus, a light emitting edge 167 is shown.

Also depicted in FIG. 4 is the enclosure layer 170. The enclosure layer 170 includes laser facing surface 171 having a cavity 172 therein. The cavity 172 is configured to fit the laser 166. Also shown are via holes 176 through which electrical contact can be made to the underlying contacts 160. The enclosure layer 170 is bonded using bond lines 168. The cavity 172 includes a concave section 174. Note that the entire cavity 172 may be concave in shape. For example, the cavity 172 may be considered to have a "bathtub" shape. However, the portion which collimates and transmits light from the laser 166 is referred to herein as the concave section 174. As can be seen in the top view, the concave section 174 may be three dimensional in nature. Thus, although described as "parabolic" in some embodiments, the concave section 174 may be a portion of a paraboloid.

The reflective layer 178 is provided on the cavity 172. Thus, the portion of the reflective layer 178 on the concave section 174 forms a parabolic mirror. The reflective layer 178 on the concave section 174 is aligned to the light emitting edge 167 such that light from the laser 166 is collimated and provided to the desired portion of the EAMR transducer 154. For example, the light from the laser 166 may be provided to an optical component such as a grating (not shown) or waveguide (not shown).

Because of their function, the cavity 172, and more specifically the concave section 174 and its reflective layer 178 may be aligned at multiple steps in fabrication of the EAMR head 150. For example, the location of the portion of the mold master corresponding to the cavity 172 and the cavity 172 itself may be precisely determined in the x-y plane, in the z-direction and tilt with respect to the x-y plane. This may be accomplished by forming alignment marks (not shown in FIG. 4) close to the cavity 170 in the mold master and thus enclosure layer 170. For example, in some embodiments, the alignment marks may be not more than fifty micrometers from the concave section 174. In some embodiments, the alignment marks are at least ten and not more than fifty micrometers from the concave section 174. Tilt may be controlled by providing stand-offs in the mold master and the carrier substrate (not shown). Some stand-offs may ensure that the mold master is not tilted with respect to the carrier substrate. Others may ensure the carrier substrate is not tilted with respect to the surface of the layer 162 to which the enclosure layer 170 is being bonded. In addition, the stand-offs may be used to control the distance between the laser-facing surface 101, and thus the height of the cavity, from the surface 162 to which the enclosure layer 170 is being bonded. For example, the distance between the laser-facing surface and the slider may be controlled to within less than 0.1 micron. In addition, the surface roughness of the cavity 172 is desired to be low because the concave section 174 is to act as a mirror. For example, the surface roughness of the cavity 172 does not exceed 10 nanometers root mean square.

Bond lines 168 may also desired to be controlled both in their height and differences in height. Control of the variation in height of the bond lines allows control of the tilt of the cavity 172 with respect to the surface of the layer 162 to which the enclosure layer is being bonded. For example, the variation in the thickness of the bond lines 168 may be desired to be less than 0.1 micrometer. The use of stand-offs may make meeting such a requirement easier. The stand-offs are for controlling the bond line thickness.

Using the method 100, the EAMR head 150 may be fabricated. Thus, the laser 166 may be sealed in a cavity 172. As a result, the laser 166 may be protected from exposure to various environments and/or other mechanisms for causing damage to the laser 166. For example, the laser 166 may be protected from moisture. The shape of the mirror formed by the reflective layer 178 and the concave section 174 and its alignment to the laser 166 may be precisely controlled. Consequently, the efficiency of coupling light to the EAMR transducer 154 may be improved. In addition, the mirror formed by the reflective layer 178 may aid in dissipating heat from the laser 166. Thus, performance of the EAMR head 150 may be improved. Further, wafer level processes may be used in fabricating the EAMR head 150. Consequently, manufacturability of the EAMR head 150 may be enhanced.

Figure 5:
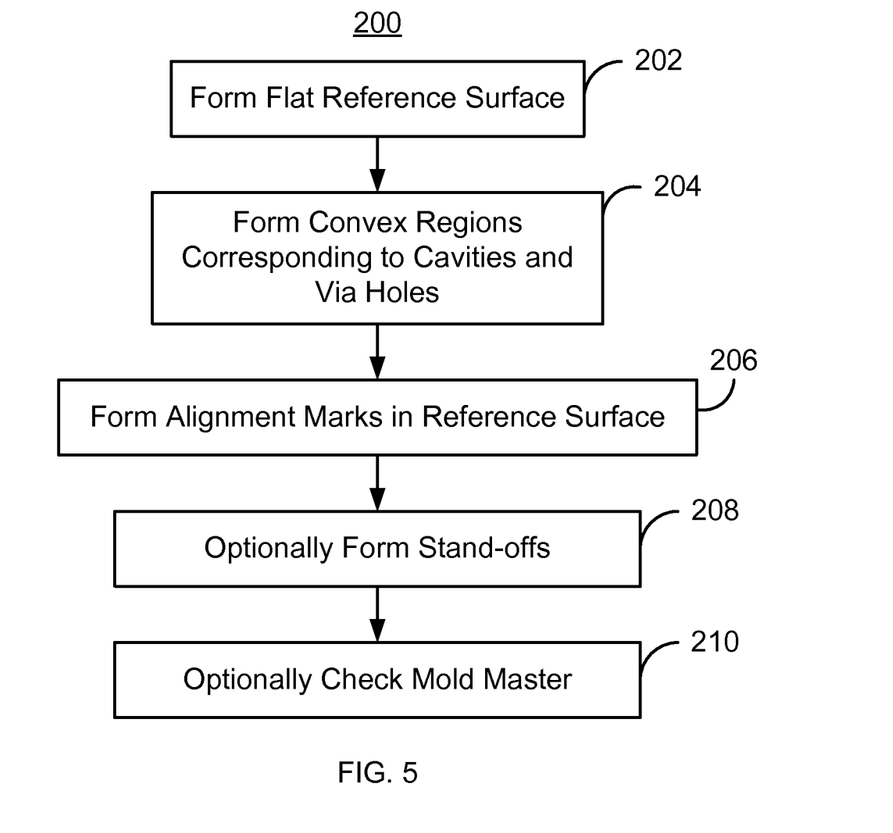
FIG. 5 is a flow chart depicting an exemplary embodiment of a method for fabricating a mold master for enclosure layers for EAMR heads.

FIG. 5 is a flow chart depicting an exemplary embodiment of a method 200 for fabricating a mold master for use in manufacturing an enclosure layer for use in EAMR heads. Although certain steps are shown, some steps may be omitted, interleaved, performed in another order, and/or combined. The EAMR heads being fabricated may be analogous to the EAMR head 150. The method 200 is described in the context of the enclosure layer 170. However, the mold master being formed may correspond to other enclosure layer(s) not shown.

A reference surface that is substantially flat is formed, via step 202. Convex regions extending from the reference surface are formed, via step 204. Step 204 may thus form convex regions that correspond to cavities 172 and via holes 176. Alignment marks may be formed in the reference surface, via step 206. In addition, stand-offs may optionally be formed, via step 208. Steps 202-208 may be carried out by forming a diamond-turned structure. Thus, steps 202-208 may be accomplished substantially simultaneously as convex regions, alignment marks, and optional standoffs are formed with respect to the flat reference surface. The mold master may be checked, via step 210. For example, the geometry of the mold master may be checked using profilometry or interferometry to ensure that the placement of features, surface variations, variations in tilt and other aspects of the mold master fall within specifications of the design for the mold master.

Figure 6:
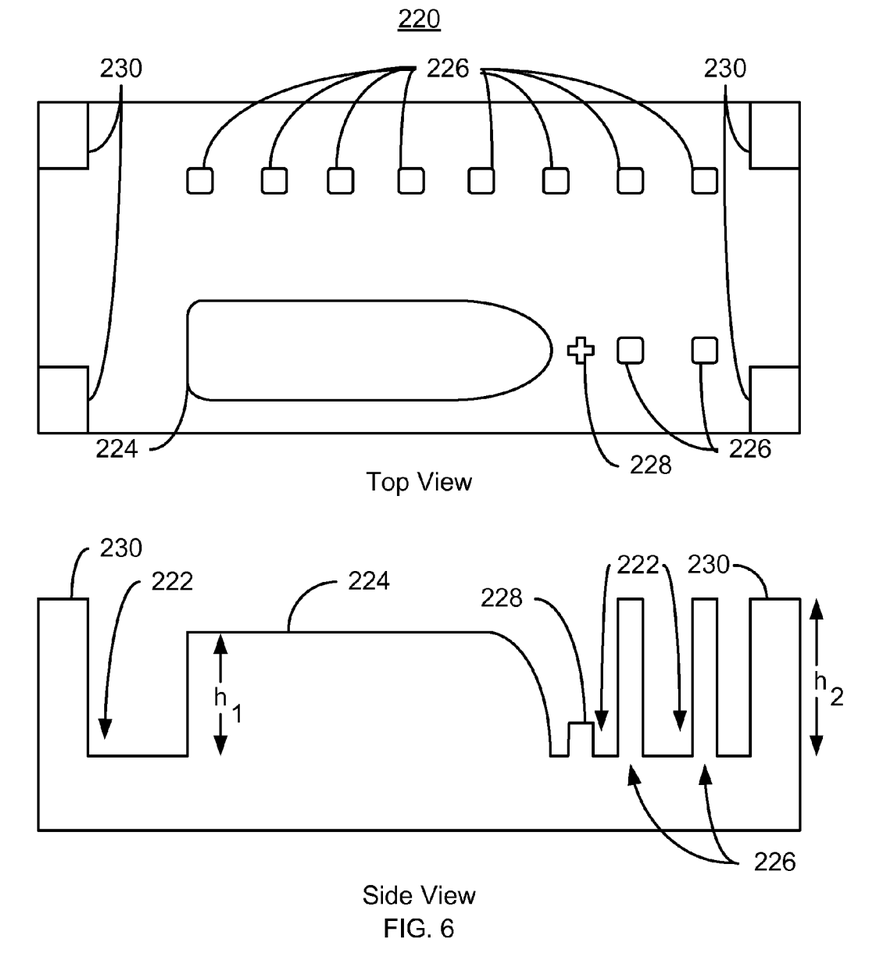
FIG. 6 depicts an exemplary embodiment of a mold master.

FIG. 6 is a diagram depicting an exemplary embodiment of a mold master 220 fabricated using the method 200. FIG. 6 depicts side and top views of the mold master 220. For clarity, FIG. 6 is not to scale. Referring to FIGS. 4-6, the mold master 220 includes reference surface 222; convex regions 224, 226, and 228; and stand-offs 230. Although features 222, 224, 226, 228, and 230 for a single enclosure layer 170 are shown, typically a mold master 220 includes features for multiple enclosure layers. In some embodiments, the mold master 220 includes sufficient features for enclosure layers for all heads 150 in a sector or all EAMR heads on a substrate.

The reference surface 222 corresponds to the laser-facing surface 171 of the enclosure layer 170. The reference surface 222 is thus desired to be substantially flat so that the cavity 172 and reflective surface 178 may be aligned. The convex regions 224, 226, and 228 correspond to features in the enclosure layer 170. More specifically, the convex region 224 corresponds to the cavity 172. The convex regions 226 correspond to the via holes 176. Although shown as having a particular (e.g. square) shape, the convex regions 226 and thus the via holes may have another shape. The heights of the convex region 224 ($h_1$) and the convex region 226 ($h_2$) from the reference surface 222 differ. This is because the via holes formed by the convex regions 226 extend through the enclosure layer 170, while the cavity 172 does not. Convex region 228 corresponds to an alignment mark (not shown in FIG. 4) in proximity to the cavity 172. In the embodiment shown, the alignment mark image 228 is in proximity to the concave section 174 of the cavity 172. The alignment mark image 228 is used to ensure that the concave section 174 of the cavity is located as desired and can be aligned with respect to the laser 166. The stand-offs 230 are all of the same height, $h_2$ in the embodiment shown. The stand-offs 230 are used to ensure that the thickness of the enclosure layer 170 and, more specifically, the height of the cavity 172 with respect to the laser-facing surface 171 is within tolerances.

Using the method 200, the mold master 220 may be fabricated. Further, the variations of features 222, 224, 226, 228, and 230 may be verified to ensure that all features are within desired specifications. The mold master 220 may then be used to fabricate enclosure layers 170 that can be used in providing EAMR heads 150 that may have improved efficiency and manufacturability.

Figure 7:
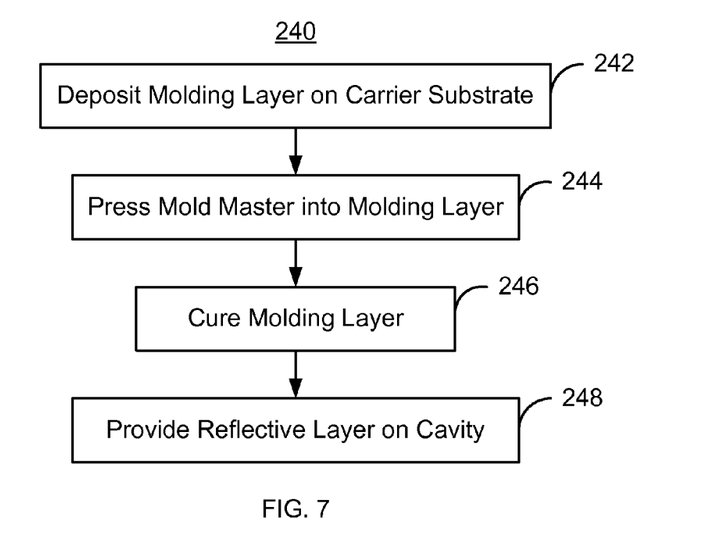
FIG. 7 is a flow chart depicting an exemplary embodiment of a method for fabricating enclosure layers capable of being used with EAMR heads.

FIG. 7 depicts an exemplary embodiment of a method 240 for fabricating enclosure layers capable of being used with EAMR heads. FIGS. 8-11 are diagrams depicting an exemplary embodiment of an enclosure layer 250 during fabrication. For clarity, FIGS. 8-11 are not to scale. Further, for simplicity, not all components are labeled in FIGS. 8-11. Referring to FIGS. 7-11, the method 240 is described in the context of the components shown. However, the method 240 may be used to form other enclosure layer(s) (not shown). Although the method 240 is described in the context of a single EAMR head depicted in FIGS. 8-10, multiple enclosure layers are typically fabricated in parallel.

Figure 8:
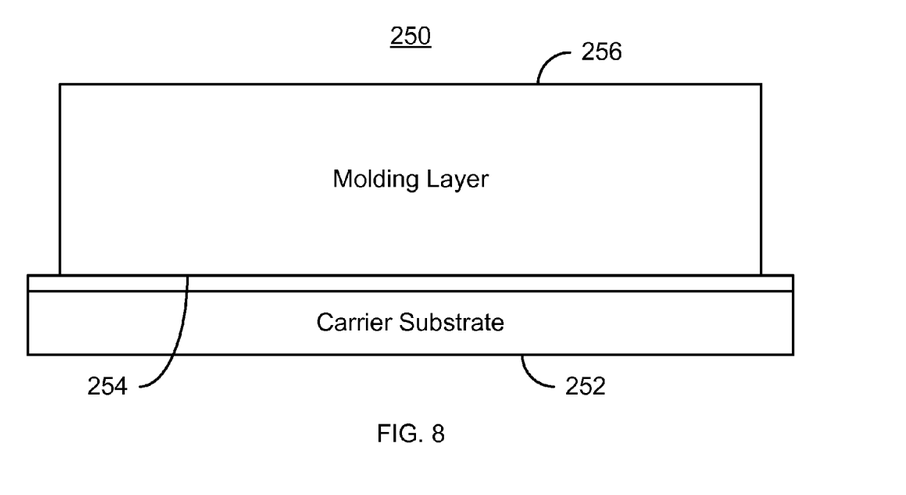
FIGS. 8-11 are diagrams depicting an exemplary embodiment of an enclosure layer during fabrication.

A molding layer is deposited on a carrier substrate, via step 242. FIG. 8 depicts the enclosure layer 250 after step 242 is performed. Thus, a molding layer 256 has been deposited on the carrier substrate 252. The molding layer 256 may include materials such as silicon, glass, a spin-on glass and photoresist. Also shown is an optional adhesive layer 254. The adhesive layer 254 may be removed using various mechanisms, such as exposure to particular chemicals, exposure to heat or exposure to ultra-violet light. For example, the adhesive layer 254 may include wax or a releasable adhesive. Thus, molding layer 256 can be separated from the carrier substrate 252. Alternatively, the adhesive layer 254 may be omitted. In such embodiments, the carrier substrate 252 may removable from the molding layer 256 using processes such as grinding.

Figure 9:
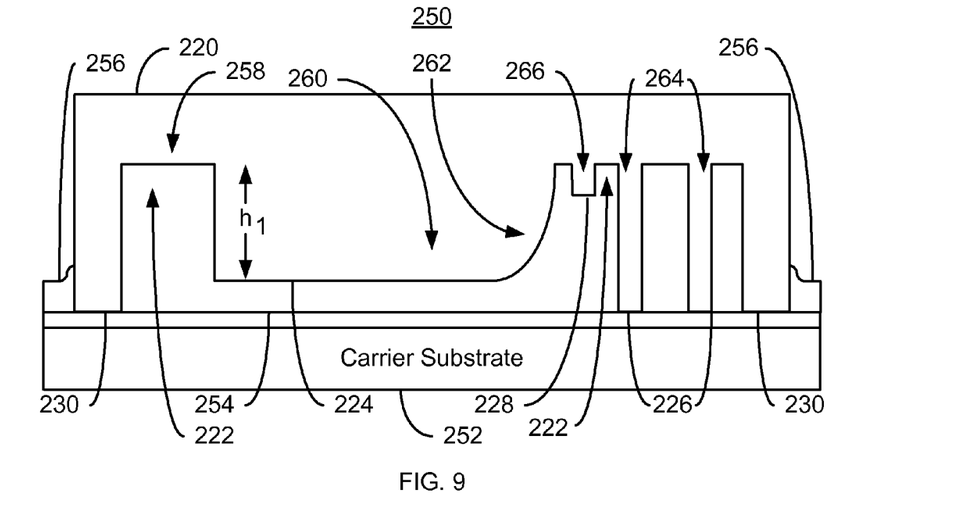

A mold master is pressed into the molding layer 256, via step 244. FIG. 9 depicts the enclosure layer 250 after step 244 is performed. For simplicity, the method 200 and enclosure layer 250 are described in the context of mold master 220. The mold master 220 includes convex portions 224 and 226 and an alignment mark image 228. The convex portions 224 form a cavity 260 having a concave section 262 and via holes 264 in the molding layer 256. The alignment mark image 228 forms an alignment mark 266 in the molding layer 256. Note that although the alignment mark image 228 is shown as convex and the corresponding alignment mark 255 concave, the alignment mark image 228 may be concave and the alignment mark 266 convex. Further, stand-offs 230 set the distance that the mold master 220 presses into the molding layer 256. Stated differently, pressure may be applied to the mold master 220 while maintaining the desired height of the cavity 260. In addition, through the use of the stand-offs 230 the tilt of the cavity 260 and, therefore, the concave section 252 may be controlled.

Figure 10:
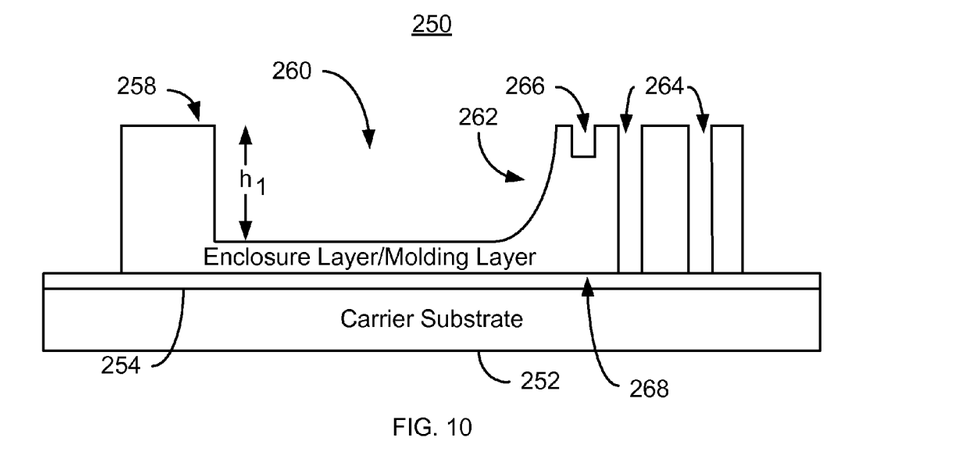

The molding layer 256 is cured to form an enclosure layer, via step 246. Step 246 may include heat treating or otherwise processing the molding layer 256. FIG. 10 depicts the enclosure layer 250 after step 246 is performed. The mold master 220 has been removed. The enclosure layer 250 has a laser-facing surface 258 and cavity 260. The enclosure layer 250 also includes a top surface 268 opposite to the laser-facing surface 255. The concave section 262 of the cavity 260 is also aligned with the alignment mark 266.

Figure 11:
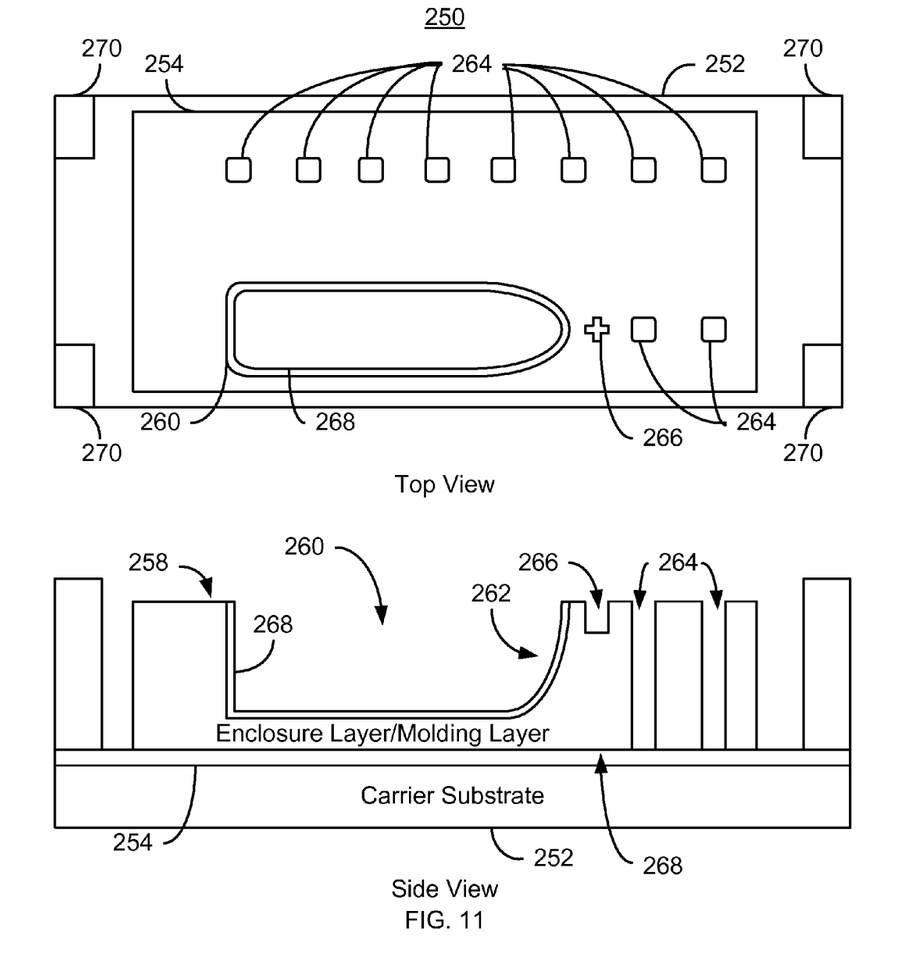

A reflective layer is provided on the cavity 262, via step 248. Step 248 includes aligning to the alignment mark 266, then depositing a reflective layer within the cavity. For example, step 266 may include depositing Cu and/or Au. FIG. 11 depicts top and side views of the enclosure layer 250 after step 248 is performed. Thus, the reflective layer 268, or mirror, is formed. Also shown are stand-offs 270, which may be formed on the carrier substrate 252. Stand-offs 270 may be used to provide the desired distance and tilt between the cavity 260 and the surface (not shown in FIG. 11) to which the enclosure layer 250 is to be bonded. Other embodiments, stand-offs are provided on the surface to which the enclosure layer is to be bonded instead of on the carrier substrate 252.

Using the method 240, enclosure layer 250 may be fabricated. The enclosure layer 250 may then be used to in providing EAMR heads that may have improved efficiency and manufacturability.

Figure 12:
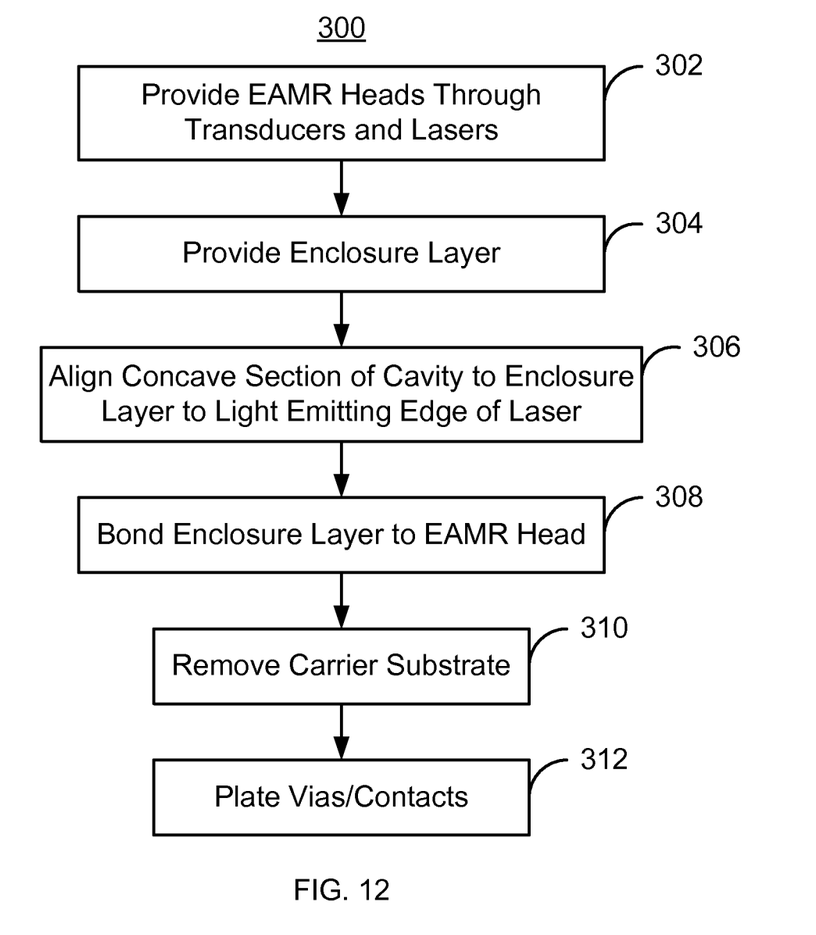
FIG. 12 depicts an exemplary embodiment of a method for fabricating EAMR heads having molded enclosure layers.
Figure 13:
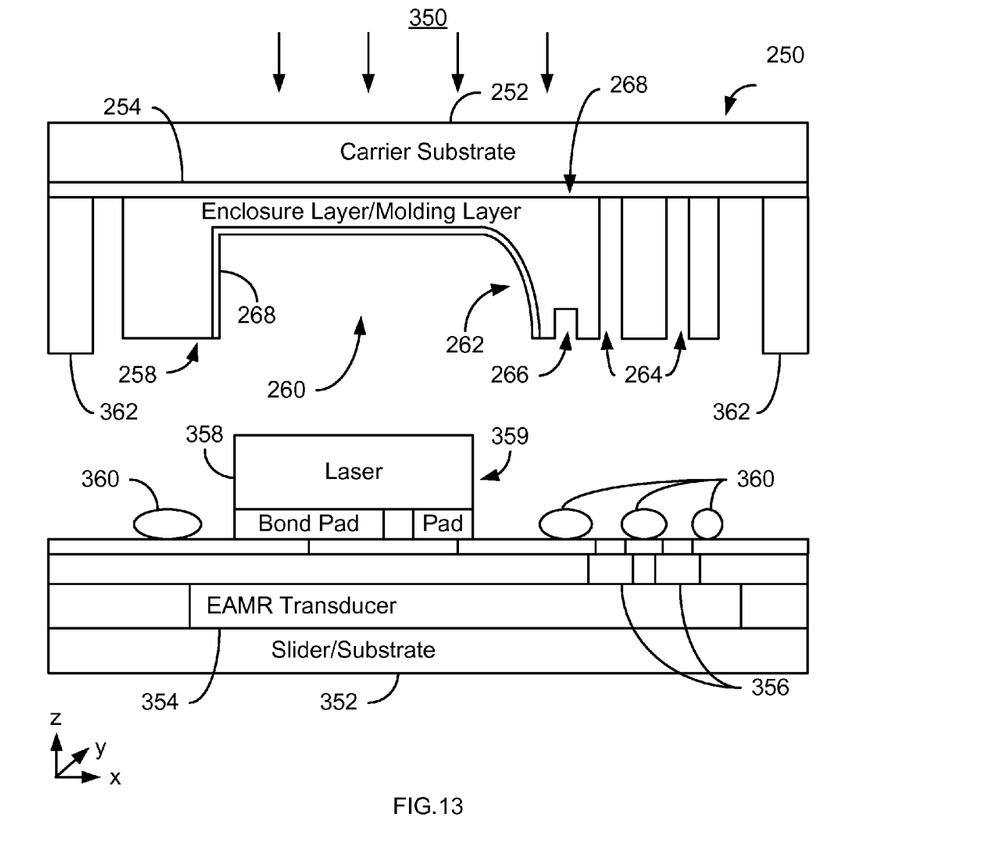
FIGS. 13-15 are diagrams depicting an exemplary embodiment of an EAMR head during fabrication.
Figure 14:
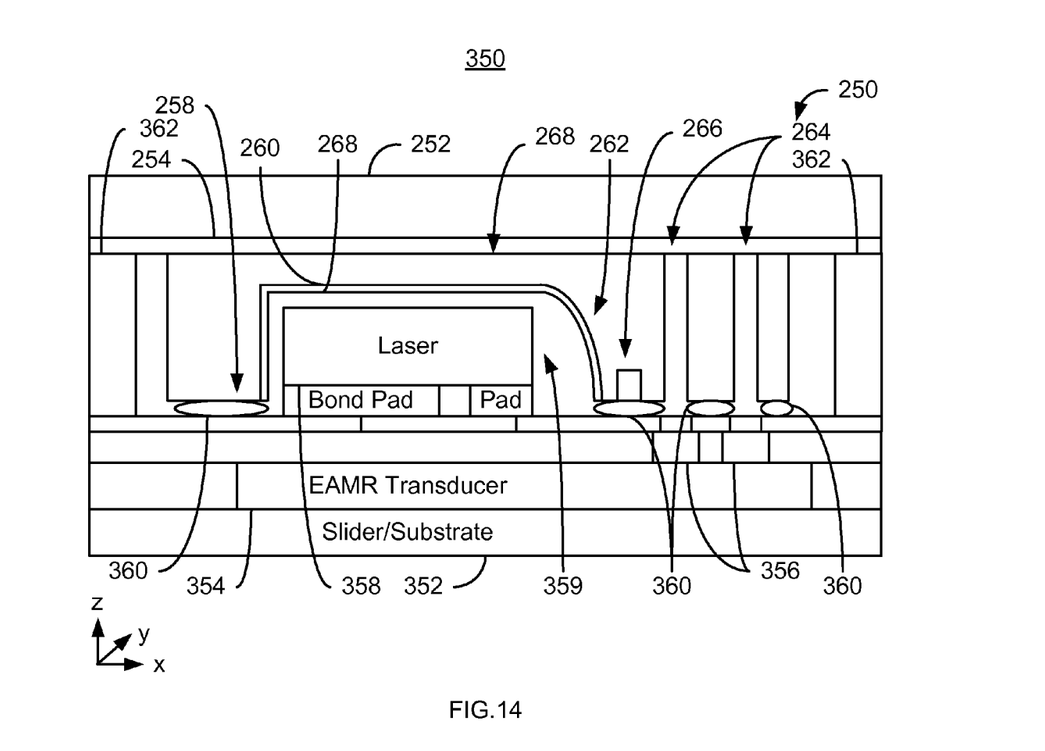
Figure 15:
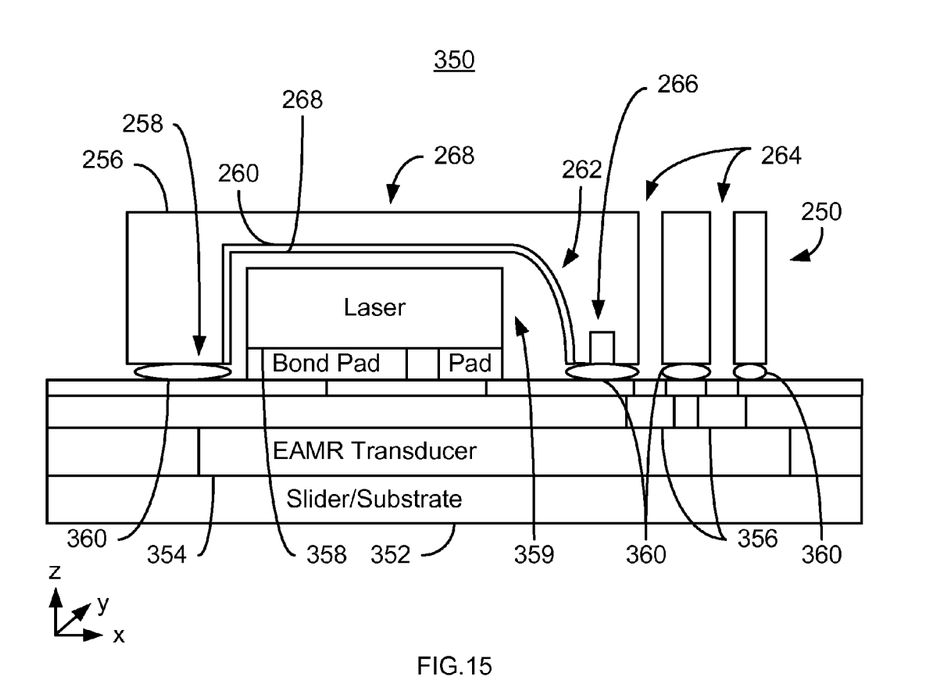

FIG. 12 is a flow chart depicting another exemplary embodiment of a method 300 for fabricating an EAMR head. FIGS. 13-15 are diagrams depicting side and trailing edge views of an EAMR head 350 during fabrication. For clarity, FIGS. 13-15 are not to scale. Further, for simplicity, not all components are labeled in FIGS. 13-15. Referring to FIGS. 12-15, the method 300 is described in the context of the enclosure layer 250. However, the method 300 may be use another enclosure layer (not shown). The EAMR head 350 being fabricated may be part of a merged head that also includes a read transducer (not shown in FIGS. 13-15) and resides on a slider of a disk drive. Although the method 300 is described in the context of a single EAMR head 350 depicted in FIGS. 12-15, multiple heads are typically fabricated in parallel.

Portions of the EAMR head 300 up through the laser are provided, via step 302. Step 302 includes forming an EAMR transducer, including magnetic and optical components. In addition, an EAMR transducer may also be provided. Further, a laser is bonded to the EAMR head 300. Bonding of the laser includes aligning lasers, then bonding the lasers. In some embodiments, multiple lasers are aligned and bonded substantially simultaneously. For example, laser bars may be aligned and bonded. In other embodiments, lasers may be individually aligned and bonded. An enclosure layer is provided, via step 304. The enclosure layer may be provided using the method 240. The enclosure layer 250, including cavity 260, concave section 262, and reflective layer 268, may be formed in step 304. Thus, a portion of an EAMR head and the enclosure layer have both been provided.

The concave second of the laser cavity is aligned to the light emitting portion of the enclosure layer, via step 306. FIG. 13 depicts the EAMR head 350 after step 306 is performed. Thus, the slider/substrate 352 having EAMR transducer 354 is shown. Also shown are contacts 354 to the transducer 354. Laser 358 including light emitting edge 259 has been bonded to the EAMR head 350. Further, the bond lines 360 are provided. In some embodiments, the bond lines 360 include a thermal epoxy or a low temperature thermal solder such as AuIn or PbSn. Also shown is alignment mark 266 on the enclosure layer 250. To align the enclosure layer 350 to the remaining portion of the EAMR head, the alignment mark 266 may be used. Alignment mark 266 is placed proximate to the concave section 262 to facilitate alignment between the light emitting edge 359 of the laser 358 and the concave section 262 of the cavity 260. In some embodiments, the alignment mark 266 is not more than fifty micrometers from the concave section 262. In other embodiments, the alignment mark is at least ten and not more than fifty micrometers from the concave section 262. This allows improved alignment of the cavity 260. Changes in distances in the x-y plane due to the coefficient of thermal expansion of the materials used in the head 350 may result in changes in locations of the alignment mark 256. However, because the alignment mark 256 is sufficiently close to the cavity 260, such thermally driven changes may not adversely affect alignment of the cavity 260. Further, stand-offs 362 have been provided on the carrier substrate 252. The stand-offs allow the enclosure layer 250 to be pressed onto the remaining portion of the EAMR head 350, while ensuring that the height and tilt of the cavity 260 are within tolerances. Thus, the concave section 262 is aligned in the x-y plane, in the z-direction, and within the tilt tolerances for the EAMR head 350.

The enclosure layer 250 is then bonded to the remaining portion of the EAMR head 350 using wafer bonding, via step 308. Thus, the bond lines 360 couple the enclosure layer 250 to the remaining portion of the EAMR head 350.

The carrier substrate 252 is removed, via step 310. In some embodiments, step 310 includes grinding or wet etching the carrier substrate 352. In other embodiments, the molding layer 254 may be attached to the carrier substrate 252 using adhesive layer 254. The adhesive layer 254 may be releasable using an appropriate mechanism. Step 310 may then include heating the EAMR head, exposing the EAMR head to ultraviolet light, providing the appropriate release mechanism. FIG. 15 depicts the EAMR head 350 after step 310 is performed. Thus, the carrier substrate 252 has been removed.

Vias are plated in the via holes 264, via step 312. Step 312 may thus include plating Cu or other conductive material. Processing of the EAMR head may then be completed. For example, the substrate 352 is separated into individual EAMR heads 350. For example, the substrate 252 may be diced and lapped. In addition, the EAMR head 350 may be incorporated into a drive.

Using the method 300, EAMR heads, such as the EAMR head 350 may be fabricated. The method 300 and EAMR head 350 share the benefits of the methods 100, 200, and 240 and EAMR head 150 and enclosure layer 250. Consequently, manufacturability and performance of the EAMR heads may be improved.

We claim:

1. A method for providing an energy assisted magnetic recording (EAMR) head including a slider, an EAMR transducer coupled with the slider and a laser coupled with the slider, the method comprising:
    molding an enclosure layer, the enclosure layer having a laser-facing surface and a top surface opposing the laser-facing surface, the laser-facing surface having a cavity therein, the cavity including a concave section;
    providing a reflective layer on the cavity, a portion of the reflective layer on the concave section for collimating light from the laser and providing the collimated light to the EAMR transducer, the reflective layer forming an integrated mirror in the cavity on the enclosure layer;
    aligning the concave section of the cavity with a light emitting portion of the laser; and
    bonding the enclosure layer to the slider.

2. The method of claim 1 wherein the laser-facing surface includes at least one alignment mark corresponding to the cavity, the molding further includes:
    aligning the concave section to the laser-facing surface and the at least one alignment mark.

3. The method of claim 2 wherein the at least one alignment mark and the concave section are spaced apart by not more than 50 microns.

4. The method of claim 1 wherein the aligning further includes:
    passively aligning the cavity.

5. The method of claim 1 wherein the aligning further includes:
    actively aligning the cavity.

6. The method of claim 1 wherein the enclosure layer further includes at least one of silicon, glass, and a polymer.

7. The method of claim 6 wherein the polymer further includes at least one of a spin-on glass and photoresist.

8. The method of claim 1 wherein the molding further includes:
    providing a molding layer on a carrier substrate;
    pressing a mold master corresponding to the enclosure layer into the molding layer; and
    curing the molding layer to form the enclosure layer.

9. The method of claim 8 further comprising:
    removing the carrier substrate after the bonding the enclosure layer to the slider.

10. The method of claim 9 wherein the removing further includes at least one of grinding the carrier substrate, chemically releasing the enclosure layer from the carrier substrate, thermally releasing the enclosure layer from the carrier substrate, and releasing the enclosure layer from the carrier substrate using ultraviolet light.

11. The method of claim 9 wherein the carrier substrate includes at least one of a Si wafer and an AlTiC substrate.

12. The method of claim 1 wherein the enclosure layer further includes a plurality of via holes therein and wherein the method further includes:
    plating a plurality of conductive vias in the plurality of via holes.

13. The method of claim 1 wherein the concave section includes a parabolic section.

14. The method of claim 1 wherein the laser emits light at an edge, the edge facing the concave section of the cavity.

15. The method of claim 1 wherein the bonding further includes:
    controlling a variation of distance between the laser-facing surface and the slider to within less than 0.1 micron.

16. A method for providing a plurality of energy assisted magnetic recording (EAMR) heads residing on a substrate, each of the plurality of EAMR heads including a slider, an EAMR transducer coupled with the slider and a laser coupled with the slider, the laser including a light emitting edge, the method comprising:
    depositing a molding layer on a carrier substrate, the molding layer including at least one of silicon, glass, a spin-on glass and photoresist;
    pressing a mold master into the molding layer, the mold master including a plurality of convex portions and a plurality of alignment mark images, the convex portions forming a plurality of cavities having a plurality of concave sections, and a plurality of via holes in the molding layer, the plurality of alignment mark images forming a plurality of alignment marks in the molding layer, the plurality of concave sections being aligned to the plurality of alignment mark images;
    curing the molding layer to form an enclosure layer, the enclosure layer having a laser-facing surface, a cavity-facing surface opposing the laser-facing surface, and the plurality of via holes therein, the laser-facing surface having the plurality of alignment marks and the plurality of cavities therein;
    providing a reflective layer on each of the plurality of cavities, a portion of the reflective layer on the concave section for collimating light from the laser and providing the collimated light to the EAMR transducer, the reflective layer forming an integrated mirror in the each of the plurality of cavities and on the enclosure layer;
    aligning each of the plurality of concave sections with a light-emitting edge of the laser of each of the plurality of EAMR heads such that the light emitting edge of the laser faces the concave section;
    bonding the enclosure layer to the substrate such that a variation in height of the enclosure layer with respect to the substrate is less than 0.1 micron;
    removing the carrier substrate using at least one of grinding the carrier substrate, chemically releasing the enclosure layer from the carrier substrate, thermally releasing the enclosure layer from the carrier substrate, and releasing the enclosure layer from the carrier substrate using ultraviolet light;
    plating a plurality of contacts in the plurality of via holes; and
    removing a portion of the substrate, thereby separating the plurality of EAMR heads.

17. A method for providing a mold master for an enclosure layer for an energy assisted magnetic recording (EAMR) head, the EAMR head including a slider, an EAMR transducer coupled with the slider and a laser coupled with the slider, the method comprising:
    forming a reference surface that is substantially flat;
    forming a plurality of alignment marks in the reference surface;
    forming a plurality of convex regions extending from the reference surface, the convex regions correspond to cavities for enclosing a laser and having a plurality of optical sections, the plurality of optical sections being aligned with respect to the reference surface and the plurality of alignment marks, a portion of at least one of the convex regions having a parabolic profile for forming a mirror for reflecting and collimating light.

18. The method of claim 17 further comprising:
    providing a stand-off on the reference surface for aligning the reference surface to another substantially flat surface within a predetermined variation.

19. A method for providing an enclosure layer for an energy assisted magnetic recording (EAMR) head, the EAMR head including a slider, an EAMR transducer coupled with the slider and a laser coupled with the slider, the method comprising:

depositing a molding layer on a carrier substrate, the molding layer including at least one of silicon, glass, a spin-on glass and photoresist, the carrier substrate being removable from the molding layer;

pressing a mold master into the molding layer, the mold master including a convex portion and an alignment mark image, the convex portion forming a cavity having a concave section and at least one via hole in the molding layer, the alignment mark image forming an alignment mark in the molding layer;

curing the molding layer to form an enclosure layer, the enclosure layer having a laser-facing surface, a top surface opposing the laser-facing surface, an alignment mark, and at least one via hole therein, the laser-facing surface having the cavity therein, the cavity configured to reside around the laser and including the concave section, the top-facing surface facing the carrier substrate, the concave section being aligned with the alignment mark; and providing a reflective layer on the cavity, the reflective layer for collimating light from the laser and providing the collimated light to the EAMR transducer, the reflective layer forming an integrated mirror in the cavity and on the enclosure layer.

20. An energy assisted magnetic recording (EAMR) head comprising:

a slider;

an EAMR transducer coupled with the slider;

a laser coupled with the slider and including a light-emitting edge;

a molded enclosure layer, the molded enclosure layer having a laser-facing surface and a top surface opposing the laser-facing surface, the laser-facing surface having a cavity therein, the cavity including a concave section facing the light-emitting edge, a reflective layer residing on the cavity, a portion of the reflective layer on the concave section for collimating light from the laser and providing the collimated light to the EAMR transducer, the reflective layer forming an integrated mirror in the cavity and on the enclosure layer.

21. The EAMR head of claim 20 wherein the enclosure layer further includes at least one of silicon, glass, and a polymer.

22. The EAMR head of claim 21 wherein the polymer further includes at least one of a spin-on glass and photoresist.

23. The EAMR head of claim 20 wherein the enclosure layer further includes a plurality of via holes therein, the EAMR had further including:

a plurality of conductive vias in the plurality of via holes.

24. The EAMR head of claim 20 wherein the concave section includes a parabolic section.

* * * * *